US011660931B2

(12) United States Patent
Mukhopadhyay et al.

(10) Patent No.: US 11,660,931 B2
(45) Date of Patent: May 30, 2023

(54) ROOF STRUCTURE AND CAB

(71) Applicant: DEERE & COMPANY, Moline, IL (US)

(72) Inventors: Sourabh Mukhopadhyay, Howrah (IN); Kaushik Halder, Kharagpur (IN); Amar Singh, Lucknow (IN); Rajashekar Varma, Tirupathi (IN); Pankaj Kumar Jha, Pune (IN); Augustine Y Chow, Johnston, IA (US); Gunnar Dietrich, Baden-Baden (DE); Anand K Kumar, Pune (IN); Saurav Basak, Kolkata (IN); Benjamin Jordan, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 861 days.

(21) Appl. No.: 16/386,673

(22) Filed: Apr. 17, 2019

(65) Prior Publication Data
US 2019/0322156 A1  Oct. 24, 2019

(30) Foreign Application Priority Data

Apr. 20, 2018  (DE) .......................... 102018206111.4
Apr. 16, 2019  (EP) ..................................... 19169597
Apr. 16, 2019  (EP) ..................................... 19169603

(51) Int. Cl.
*B60H 1/24* (2006.01)
*B60H 1/00* (2006.01)
*B62D 33/06* (2006.01)

(52) U.S. Cl.
CPC ......... *B60H 1/245* (2013.01); *B60H 1/00378* (2013.01); *B62D 33/0617* (2013.01)

(58) Field of Classification Search
CPC . B60H 1/245; B60H 1/00378; B62D 33/0617
(Continued)

(56) References Cited

U.S. PATENT DOCUMENTS 4,072,487 A  2/1978  Irwin
4,097,085 A  6/1978  Nelson
(Continued)

FOREIGN PATENT DOCUMENTS

DE  102016201648 A1  8/2017
EP  0733503 A1  9/1996
(Continued)

OTHER PUBLICATIONS

European Search Report issued in counterpart application No. 19169597.2 dated Sep. 18, 2019. (17 pages).
(Continued)

*Primary Examiner* — Allen R. B. Schult
(74) *Attorney, Agent, or Firm* — Taft Stettinius & Hollister LLP; Stephen F. Rost

(57) ABSTRACT

A roof structure for an agricultural vehicle includes an upper roof assembly and a lower roof assembly connectable to the upper roof assembly. The lower roof assembly or the upper roof assembly includes a ventilation opening for guiding air-conditioned air and a circulation opening for supplying recirculated air. An air-guiding element is arranged between the lower and upper roof assembly. The air-guiding element is further disposed at the circulation opening and the ventilation opening such that a region sealed in relation to an external environment is formed.

20 Claims, 4 Drawing Sheets

(58) Field of Classification Search
USPC .................................................. 454/137
See application file for complete search history.

(56) References Cited

U.S. PATENT DOCUMENTS

| | | | |
|---|---|---|---|
| 4,189,987 | A | 2/1980 | Amberg et al. |
| 4,641,502 | A | 2/1987 | Alddrich et al. |
| 5,076,821 | A | 12/1991 | Bruhnke et al. |
| 5,310,239 | A | 5/1994 | Koske et al. |
| 5,484,221 | A | 1/1996 | DeCoux |
| 5,913,566 | A | 6/1999 | Stauffer et al. |
| 6,178,612 | B1 | 1/2001 | Gernstein |
| 6,223,807 | B1 | 5/2001 | Asche et al. |
| 6,279,978 | B1 | 8/2001 | Schreyer et al. |
| 6,398,294 | B1 | 6/2002 | Bollweg et al. |
| 6,719,361 | B1 | 4/2004 | Adams et al. |
| 6,768,423 | B2 | 7/2004 | Doescher et al. |
| 6,773,056 | B2 | 8/2004 | Fischer et al. |
| 6,780,097 | B2 | 8/2004 | Shuttleworth |
| 6,883,860 | B1 | 4/2005 | Budge |
| 6,938,677 | B2 | 9/2005 | Yamakawa et al. |
| 7,334,834 | B2 | 2/2008 | Hill et al. |
| 7,338,357 | B2 | 3/2008 | Voit, II et al. |
| 7,484,793 | B2 * | 2/2009 | Baro ............... B60H 1/00378 296/190.09 |
| 7,726,142 | B2 | 6/2010 | Keen |
| 8,328,608 | B2 | 12/2012 | Kajiya |
| 8,403,734 | B2 | 3/2013 | Bruss |
| 8,459,727 | B2 | 6/2013 | Mayr et al. |
| 8,568,209 | B2 * | 10/2013 | Boxum ............... B60H 1/247 454/137 |
| 8,944,199 | B2 | 2/2015 | Fukunaga et al. |
| 9,248,773 | B2 | 2/2016 | Sato et al. |
| 9,643,472 | B2 | 5/2017 | Sakamoto et al. |
| 9,821,629 | B2 | 11/2017 | Thompson et al. |
| 9,902,233 | B2 | 2/2018 | Thompson et al. |
| 11,305,609 | B2 | 4/2022 | Ferri et al. |
| 2004/0144850 | A1 * | 7/2004 | Shuttleworth ......... B60H 1/245 237/12 |
| 2007/0044492 | A1 * | 3/2007 | Ichikawa ............ B60H 1/00378 62/239 |
| 2007/0205633 | A1 | 9/2007 | Waco et al. |
| 2008/0032619 | A1 * | 2/2008 | Voit .................. B60H 1/00378 454/158 |
| 2012/0003911 | A1 | 1/2012 | Geiss et al. |
| 2013/0203333 | A1 | 8/2013 | Amura et al. |
| 2013/0244561 | A1 | 9/2013 | Bruss et al. |
| 2014/0216257 | A1 | 8/2014 | Knowles |
| 2014/0345467 | A1 | 11/2014 | Viglione et al. |
| 2015/0140917 | A9 | 5/2015 | Bruss et al. |
| 2016/0074794 | A1 | 3/2016 | Sudermann et al. |
| 2018/0178627 | A1 | 6/2018 | Ferri et al. |
| 2018/0178633 | A1 | 6/2018 | Falagario et al. |
| 2018/0264912 | A1 | 9/2018 | Hipp-Kalthoff et al. |
| 2019/0009826 | A1 | 1/2019 | Behnke et al. |
| 2020/0114724 | A1 | 4/2020 | Chauvel et al. |

FOREIGN PATENT DOCUMENTS

| | | |
|---|---|---|
| EP | 3176058 A1 | 6/2017 |
| EP | 19169677.2 A1 | 10/2019 |
| EP | 19169603.8 A1 | 10/2019 |
| JP | 3579279 B2 | 10/2004 |
| MX | 2013002743 A | 10/2013 |

OTHER PUBLICATIONS

European Patent Office (EPO) Deutschland; EP Search Report of corresponding application 19169603.8; dated Sep. 18, 2019; pp. 1-17.

European Patent Office (EPO) Deutschland; EP Search Report of corresponding application 19169597.2; dated Sep. 18, 2019; pp. 1-17.

\* cited by examiner

ROOF STRUCTURE AND CAB

RELATED APPLICATIONS

This application claims priority to German Patent Application Ser. No. 102018206111.4, filed Apr. 20, 2018, European Patent Application Ser. No. 19169597.2, filed Apr. 16, 2019, and European Patent Application Ser. No. 19169603.8, filed Apr. 16, 2019, the disclosures of which are hereby incorporated by reference in their entirety.

FIELD OF THE DISCLOSURE

The present disclosure relates to a roof structure and a cab.

BACKGROUND

During the use of an agricultural vehicle, for example, a self-propelled field sprayer or a tractor with an attached or fitted spraying device, use is frequently made by spraying in the field of chemical substances, in particular chemical crop protection products such as pesticides, herbicides or fungicides. The external environment, in particular the ambient air, can thereby be loaded with impurities, for example, with dust, aerosols and chemical vapours and gases such as chemical substances. In order to protect the driver in the cab against impurities of this type, it is known to provide the cab with a filter element which filters or cleans the air sucked up from the external environment and outputs the filtered air into the interior of the cab. For this purpose, the standard EN 15695 for protecting the driver of agricultural vehicles provides various categories for cabs, and therefore certain specifications have to be met depending on the cab category.

A cab of category 4 (CAT IV), which describes a cab having high requirements regarding air purity has to be designed, for example, in such a manner that impurities may pass from the external environment into the interior of a roof structure or cab. Furthermore, agricultural vehicles are frequently used in hot or cold external temperatures that are unpleasant for the driver, and therefore the air within the cab not only has to be filtered, but also air-conditioned. For this reason, the cab is also provided with an air-conditioning installation for air-conditioning the air in the interior of the cab, for example, with a heater or an air-conditioning-system assembly. The filter installation or the air-conditioning installation can be arranged in particular in the roof structure.

Furthermore, DE 10 2004 004197 A1 discloses a roof structure which is formed in two parts and has a filter installation and an air-conditioning installation. The two-part roof structure comprises a lower and upper roof assembly, wherein a sealant is provided at the peripheral connecting points of the lower and upper roof assembly, i.e., at the connecting points facing the external environment. The sealant is a foam- or a putty-based sealant in order to prevent impurities from penetrating the roof structure. However, two-part roof structures of this type do not meet the category 4 requirements of EN 15695 since the sealant does not adequately seal the interior space of the roof structure and therefore also the interior of the cab. Impurities can thus pass from the external environment into the roof structure and therefore into the interior of the cab, which leads to the driver being directly exposed to the harmful impurities.

It has been attempted to solve the above disadvantages by means of a roof structure which consists of a single-part roof structure since, on account of the single-part design of the roof structure, sealant can be substantially dispensed with. However, this solution approach is disadvantageous since the installation of the filter installation and air-conditioning installation, i.e., the laying of lines, hoses and the electrical cabling and also the fitting of the air-conditioning-system assembly and filter, is highly complicated. Furthermore, the maintenance of the filter installation and air-conditioning installation, for example, the repair of a line or the replacement of the air-conditioning-system assembly or of the filter is virtually impossible in such a single-part structure. The known solution approaches thus lead to a higher outlay on maintenance or put the driver's health at risk.

Thus, there is a need for a roof structure and a cab which avoid the penetrating of impurities into the interior space of the roof structure or the interior of the cab or are configured in a structurally simple manner or have simplified accessibility for maintenance purposes.

SUMMARY

In the present disclosure, a roof structure for an agricultural vehicle is proposed. The roof structure comprises an upper roof assembly and a lower roof assembly, wherein the upper roof assembly is releasably or fixedly connectable or connected to the lower roof assembly. For example, the upper roof assembly is releasably fastenable, coupleable or fastened to the lower roof assembly. The lower roof assembly or the upper roof assembly comprise at least one ventilation opening for supplying air-conditioned air, in particular from the roof structure into the cab, and a circulation opening for supplying recirculated air such as from the cab into the roof structure. The air-conditioned air here can be a mixture of recirculated air or fresh air. The roof structure furthermore comprises an air-guiding element. The air-guiding element is arranged between the lower and upper roof assembly, at the circulation opening and at the ventilation opening in such a manner that a region sealed in relation to an external environment is formed. For example, the air-guiding element is designed as a region sealed in relation to an external environment.

The agricultural vehicle can be an agricultural tractor unit or harvester, specifically a tractor or a self-propelled field sprayer or the like. However, instead of an agricultural vehicle, the roof structure or cab can also be for a construction machine, for example, an excavator or the like. A sealed region can be understood below as meaning a region within the roof structure that is sealed in relation to the external environment, i.e., in relation to regions within and outside the roof structure, and into which no contaminants can penetrate from the external environment. The external environment can be, for example, the region or space outside the roof structure or an interior space of the roof structure. The sealed region can therefore be formed by the air-guiding element itself, in particular by the arrangement of the air-guiding element in, and the connection of the air-guiding element to, the roof structure.

The lower roof assembly or the upper roof assembly can be formed from plastic or from metal. Moreover, the assemblies may be formed from a composite material such as a thermosetting or heat-curing composite material. Furthermore, the lower or upper roof assembly can have a molded part, a rotationally molded part, or a blow-molded part. Alternative, each assembly can be a molded part, a rotationally molded part, or a blow-molded part. The lower or upper roof assembly can also be produced by means of compression molding or roto-molding, for example, rotational sintering, rotational melting, rotational casting, injection blow molding, double-layer thermoforming or 3D printing.

The air-guiding element can be releasably or fixedly connected to the lower or upper roof assembly. For instance, it can be releasably or fixedly fastened to or in the lower or upper roof assembly. The air-guiding element can also be releasably or fixedly connected or fastened to the circulation opening or the ventilation opening or the connecting points can be sealed. The air-guiding element can also be connected in terms of flow to the circulation opening or the ventilation opening. The ventilation opening or the circulation opening can be formed in particular in the lower or upper roof assembly. The ventilation opening here can have an air slot or an air grid with which the quantity and the direction of an air flow into the cab can be set precisely or to meet requirements.

The upper roof assembly can have the same peripheral profile as the lower roof assembly, and therefore the upper roof assembly can be adapted or shaped in a complementary manner to the lower roof assembly in order to surround or to cover the air-guiding element. The air-guiding element in turn can form the sealed region. Furthermore, the lower or upper roof assembly can comprise a removable access panel designed, for example, in the form of a sheet in order to permit maintenance or repair of the components in the roof structure and, in particular, in the air-conditioning installation. Under some circumstances, it can be required to provide a sealant or an insulation material between the upper and lower roof assembly in the roof structure. In addition, a seal, i.e., a sealant or putty, can be used at the outer connecting points of the lower and upper roof assembly in order to configure the assembled roof structure to be waterproof. A foam seal or foam insulation can be provided for sealing between the roof assemblies. In addition, the upper and lower roof assembly can be fastened to each other with fastening means or with adhesive means.

In accordance with the arrangement of the air-guiding element in the roof structure and, by means of the air-guiding element itself, a region which is sealed in relation to the external environment is formed in the roof structure. No impurities from the external environment, i.e., from the ambient air, pass into the sealed region. On account of the sealed region, the recirculated air supplied from the cab via the circulation opening is kept free from impurities from the external environment. It is therefore possible to prevent impurities from penetrating at the outer connecting points of the lower and upper roof assembly. It is further possible to prevent impurities from penetrating even if the sealant has a leakage into the roof structure or the air-guiding element and into the air circuit, i.e., the air-guiding region, and therefore from passing via the air-conditioning chamber or outlet chamber into the cab. It is thereby ensured that the driver in the interior of the cab is not directly exposed to harmful impurities and the driver's health is not put at risk by breathing in unfiltered ambient air loaded with harmful impurities. Furthermore, because of the simple structural arrangement of the air-guiding element in the roof structure and the simple configuration of the roof structure, simple access to the installations and components which are arranged or can be arranged in the roof structure continues to be ensured. Maintenance work to the roof structure can therefore be carried out in a simple manner, and at the same time the category 4 requirements of EN 15695 can be met.

In another embodiment, the air-guiding element comprises an air-conditioning chamber for guiding air-conditioned air, an inlet chamber for guiding fresh air or for guiding recirculated air, and an outlet chamber for guiding or supplying air-conditioned air into the cab. The air-conditioning chamber is arranged between the inlet chamber and the outlet chamber. The inlet chamber and the outlet chamber are designed as chambers which are separated from each other. In other words, the air-conditioning chamber can be arranged between the inlet chamber and the outlet chamber in such a manner that the inlet chamber and the outlet chamber are designed as chambers which are separated from each other. The air-conditioning chamber can therefore be connected in terms of flow to the inlet chamber and the outlet chamber, whereas the inlet chamber and the outlet chamber can each be connected in terms of flow only to the air-conditioning chamber. The air-guiding element can be designed as a closed duct or as a tubular body, in particular with the chambers mentioned, or can have a U shape. The shape or the cross section of the air-guiding element can be adapted to the geometry of the lower roof assembly, the upper roof assembly, the fresh air opening or circulation openings.

The air-guiding element can be in one piece or two pieces or multiple pieces. In particular, the single-piece air-guiding element can therefore be a single-part component or the two-piece air-guiding element can be a two-part component or the multi-piece air-guiding element can be a multi-part component. In particular, the two-piece air-guiding element can be an upper and lower air-guiding piece, wherein the upper air-guiding piece can be arranged in the upper roof assembly and the lower air-guiding piece can be arranged in the lower roof assembly. During the connecting or fastening of the upper and lower roof assembly, the upper and lower air-guiding pieces are pressed onto each other here and thus seal the air-guiding element. However, the two-piece air-guiding element can also comprise a first and second air-guiding piece. The first air-guiding piece can comprise the inlet chamber or at least partially or entirely the air-conditioning chamber, and the second air-guiding piece can comprise the outlet chamber or at least partially the air-conditioning chamber. However, the first air-guiding piece can also comprise the inlet chamber and the air-conditioning chamber, and the second air-guiding piece can comprise only the outlet chamber. The first and second air-guiding piece or the upper and lower air-guiding piece can be releasably or fixedly connected to each other or fastened, for example, welded or adhesively bonded, to each other. The inlet chamber and the outlet chamber and the air-conditioning chamber can be designed as chambers which are spatially separated from one another. The air-guiding element can also comprise a further inlet chamber, a further outlet chamber, or a further air-conditioning chamber.

In particular, a first and second inlet chamber, a first and second outlet chamber, or a first and second air-conditioning chamber can be provided. The first and second inlet chamber and the first and second outlet chamber can be arranged diametrically or mirror-symmetrically with respect to the air-conditioning chamber, in particular with respect to the first or second air-conditioning chamber.

A sealed region with an inlet chamber, outlet chamber and an air-conditioning chamber can therefore be formed within the roof structure, in particular in a structurally simple manner. Furthermore, it is possible to prevent impurities from penetrating the roof structure or even passing into the cab.

In a further embodiment, the lower roof assembly or the upper roof assembly comprise a fresh air opening for supplying fresh air, in particular into the roof structure from outside. The air-guiding element here is arranged between the lower and upper roof assembly, and at the fresh air opening, the circulation opening, and at the ventilation opening in such a manner that the air-guiding element is designed as a region sealed in relation to an external environment. The air-guiding element can be fixedly or releasably fastened or connected at the fresh air opening. The air-guiding element can also be connected in terms of flow to the fresh air opening. The fresh air opening or ventilation opening or the circulation opening can be formed in particular in the lower or upper roof assembly.

In another aspect of the disclosure, the air-guiding element at the inlet chamber or the air-conditioning chamber has a fresh air inlet for supplying fresh air into the air-guiding element and a circulation inlet for supplying recirculated air into the air-guiding element. In addition, the air-guiding element at the outlet chamber has an air outlet in order to guide the air-conditioned air mixture consisting of fresh air and recirculated air out of the air-guiding element into the cab. The fresh air opening is connected here to the fresh air inlet and the circulation opening to the circulation inlet and the air outlet to the ventilation opening in such a manner that the fresh air and the recirculated air can be mixed in the air-guiding element and can be guided in the air-guiding element from the fresh air opening and the circulation opening to the air outlet. The fresh air opening can be fixedly or releasably connected to the fresh air inlet and the circulation opening can be fixedly or releasably connected to the circulation inlet and the air outlet to the ventilation opening, such that it can be fastened to one another, or the connecting points can be sealed. In particular, the inlet chamber can comprise the fresh air inlet and the circulation inlet. The air-conditioning chamber here can additionally comprise a further fresh air inlet. In another example, the inlet chamber can comprise the circulation inlet and the air-conditioning chamber the fresh air inlet.

The air-guiding element can have one, two or more fresh air inlets and one, two or more circulation inlets, particularly if the air-guiding element comprises two or more inlet chambers each having a fresh air opening or a circulation opening or comprises two or more air-conditioning chambers each having a fresh air opening. The air-guiding element can also comprise two or more air outlets, particularly if the air-guiding element comprises two or more outlet chambers each having an air outlet. The air-guiding element comprises the same number of inlet chambers and outlet chambers. The two or more inlet chambers or outlet chambers can be designed as chambers which are separated spatially from one another in the air-guiding element.

However, the further inlet chamber can also comprise the further fresh air inlet or a further circulation opening. The air-conditioning chamber can also comprise a further fresh air inlet or the further air-conditioning chamber can comprise the further fresh air inlet. The outlet chamber or the further outlet chamber can comprise a further air outlet. As a special measure, the first inlet chamber can comprise a first fresh air inlet or the first circulation inlet, and the second inlet chamber can comprise a second fresh air inlet and a second circulation inlet. At the same time, the air-conditioning chamber can comprise no inlet or a third fresh air inlet. Moreover, the first inlet chamber can comprise a first circulation inlet and the second inlet chamber can comprise a second circulation inlet. At the same time, the air-conditioning chamber can comprise a first fresh air inlet and the second air-conditioning chamber can comprise the second fresh air inlet. The fresh air opening can therefore be connected in a communicating manner, i.e., connected in terms of flow, to the fresh air inlet and the circulation opening can be connected in a communicating manner, i.e., connected in terms of flow, to the circulation inlet, and these two openings in turn can be connected in a communicating manner, i.e., connected in terms of flow, to the air outlet in the outlet chamber. The fresh air can therefore be supplied to the air-guiding element via the fresh air opening and the fresh air inlet, and the recirculated air via the circulation opening and the circulation inlet. The fresh air and the recirculated air in the inlet chamber or the air-conditioning chamber can be mixed in the air-guiding element and can be supplied to the outlet chamber and can be supplied from the outlet chamber to the cab by means of the air outlet. It is therefore possible to prevent the driver in the interior of the cab from being directly exposed to harmful impurities and for the driver's health to be put at risk by breathing in unfiltered ambient air loaded with harmful impurities.

In another aspect of the disclosure, a filter arrangement such as a first filter element or a first fan, is arranged at the fresh air opening or at the fresh air inlet. The filter arrangement can be fixedly or releasably connected, in particular fastened, to the fresh air inlet or the fresh air opening. The filter arrangement can comprise a line or a first filter element or a holder with a fastening element, in order to hold or to fasten the filter arrangement or can comprises the first fan. The first fan can have a first fan inlet and a first fan outlet. The first fan inlet can suck up or suction fresh air from the first filter element or the first fan outlet can discharge air into the outlet chamber. The first filter element can comprise at least one filter. For example, the filter arrangement can comprise only the first filter element. In this case, the first filter element, e.g., a filter, can be arranged at or coupled to the fresh air inlet or the fresh air opening. The lower roof assembly can then comprise a shaped fresh air duct which can be arranged in the outer periphery of the lower roof assembly, i.e., in the area which is oriented in the direction of the cab. The fresh air duct can be surrounded or covered by a removable dust collection device or inlet grid. The fresh air opening can likewise be arranged at or along the outer periphery of the lower roof assembly, and in particular can also be surrounded by the fresh air duct.

The first filter element can be removably adapted to the fresh air duct. Fresh air can therefore be sucked up through the inlet grid and passes through the first filter element before the fresh air can be supplied to the air-guiding element. In a second example, the filter arrangement can comprise the line and the first filter element and a holder with a fastening element, and the first fan. In this case, the line can be releasably connected or coupled to the fresh air inlet or to the fresh air opening. In addition, the first filter element can be arranged outside the roof structure, for example at the cab, in particular can be fixedly or releasably fastened or connected to the cab by means of the holding element. This ensures that the first filter element, in particular in the two examples, can be changed in a simple manner and an unnecessary outlay on maintenance is avoided. As a result, in particular in the second example, the front area of the first filter element and thus the air flow into the roof structure or the pressure in the cab can be increased. Furthermore, the CAT IV requirements can thus be met with just one pressure regulator. In addition, the motor of the first fan is self-cooling, and further fans, in particular in the roof structure, can be omitted, which reduces the noise level and the structural complexity.

In a further embodiment, the air-guiding element is made from a plastic. In particular, the air-guiding element can be a foam made of plastics. The foam can be a foam made of plastic, such as expanded plastic including expanded polypropylene (EPP), expanded polyethylene (EPE), expanded polystyrene (EPS), expanded polyethylene terephthalate (PET), an expanded biopolymer, or polyurethane foam (PUR). However, the air-guiding element can also be made from a composite material such as a thermosetting or heat-curing composite material. The air-guiding element can also, however, be made from a metal, in particular from a foam made of metal. Furthermore, it can have a molded part or a rotationally molded part or a blow molded part, or else can be a molded part, a rotationally molded part, or a blow molded part. The air-guiding element can also be produced by means of compression molding or roto-molding, for example, rotational sintering, rotational melting, rotational casting, injection flow molding, double-layer thermoforming or 3D printing. The air-guiding element can thus be configured in a structurally more simple and technically more efficient manner.

Further, the air-guiding element, in particular if the air-guiding element is made from foam, can reduce the cross-sectional area of the air-guiding element, and therefore the pressure in the air-guiding element can be increased. In particular, the cross-sectional area of the air-guiding element can lie within a range of 7000 to 9000 mm² (square millimetres), in particular 8874 mm² (square millimetres), or can be reduced by 30% to 50%, such as by 40%. In addition, the portion of recirculated air can be reduced, which leads to an increase in the pressure in the cab. The portion of recirculated air can be reduced by 10% to 20%, such as by 14%. Furthermore, the air-guiding element can be used as a seal at the connecting points to the external environment, for example, at the fresh air opening and the fresh air inlet.

In another embodiment, a second filter element is removably arranged at the circulation opening or at the circulation inlet. The second filter element can comprise at least one filter. It is thereby ensured that the second filter element can be changed in a simple manner and an unnecessary outlay on maintenance is avoided.

In a yet another embodiment, either the filter arrangement (i.e., the line) and the air-guiding element (i.e., the fresh air inlet) or the filter arrangement (i.e., the line) and the roof structure (i.e., the fresh air opening) are connected by means of a coupling element. The filter element can therefore be releasably or fixedly connected to the fresh air inlet, to the roof structure, or the fresh air opening, or fastened thereto by means of the coupling element. The fresh air can thus be introduced uniformly into the roof structure. In addition, the recirculation zone, as the region in the air-guiding element, in which fresh air and recirculated air are mixed, can be reduced to a minimum, and therefore the pressure in the cab is increased.

In yet a further embodiment, the air-guiding element comprises a cable duct. In one example, one or more connecting lines such as for the heater or a heat exchanger, i.e., electrical lines or air-conditioning lines or pipes, can be arranged in the cable duct on the air-guiding element. This measure prevents connecting lines from running in the sealed region and, for example, in the event of leakage of the connecting lines, prevents impurities from passing into the sealed region. Furthermore, the connecting lines in the cable duct are accessible in a simple manner and can therefore be maintained in a simple manner.

In an alternative embodiment, a second fan can be arranged or is arranged in the air-conditioning chamber or in the outlet chamber, i.e., in the air-guiding element. Furthermore, an air-conditioning-system assembly can be arranged or is arranged at or in the air-conditioning chamber or at or in the outlet chamber. The second fan here has a second fan inlet and a second fan outlet, wherein the second fan inlet sucks up air from the air-conditioning chamber or the second fan outlet discharges air into the outlet chamber or from the air-guiding element. The second fan can either be arranged in the air-conditioning chamber or in the outlet chamber (i.e., in a fan receptacle in the air-conditioning chamber or in the outlet chamber), which fan receptacle is designed for receiving or for the fastening of the second fan. The second fan can either be arranged in the outlet chamber or in the air-conditioning chamber, or else can be partially arranged in the air-conditioning chamber and the outlet chamber. In particular, it is possible for two second fans to be provided and to be able to be arranged or to be arranged in the air-guiding element, in particular to be able to be arranged or to be arranged in one fan receptacle each. The air-guiding element can have an air-conditioning outlet in the air-conditioning chamber and an air-conditioning inlet in the air-conditioning chamber or in the outlet chamber. The air-conditioning-system assembly can be arranged at the air-conditioning inlet and air-conditioning outlet, in particular can be connected in terms of flow thereto, in such a manner that the mixture of fresh air and recirculated air can be guided or can flow out of the air-conditioning outlet of the air-conditioning chamber into the air-conditioning-system assembly and out of the air-conditioning-system assembly into the air-conditioning inlet of the air-conditioning chamber or the outlet chamber.

In particular, the air-conditioning-system assembly can be arranged between the air-conditioning chamber and the outlet chamber of the air-guiding element. In this case, the air-conditioning-system assembly can be arranged at the air-conditioning inlet and air-conditioning outlet in such a manner that the mixture of fresh air and recirculated air can be guided or can flow out of the air-conditioning outlet of the air-conditioning chamber into the air-conditioning-system assembly and out of the air-conditioning-system assembly into the air-conditioning inlet of the outlet chamber. The air-conditioning-system assembly can comprise a heat exchanger, in particular an evaporator, a heater assembly, or a heater, and can have heating elements or cooling elements in order to provide both a heating function and a cooling function. The air-conditioning-system assembly can be arranged in particular at or in the air-conditioning chamber, which is designed for receiving or for the fastening of the air-conditioning-system assembly, and at the outlet chamber. In another manner, a negative pressure can thus be generated in the air-conditioning chamber or outlet chamber and a positive pressure in the roof structure or cab. Furthermore, the air can therefore be guided out of the sealed region directly to and away from the air-conditioning-system assembly.

In addition, the present disclosure relates to a cab for an agricultural vehicle having a roof structure as described herein. In one aspect, the cab comprises at least one side wall and the roof structure with a filter arrangement. The filter arrangement can comprise a holder with a fastening element, and the holder can hold the filter arrangement (i.e., the first filter element), or the filter arrangement is fastenable or can be fastened to the roof structure or the side wall by means of the fastening element.

The roof structure, in particular the assembled roof structure, can be used as a roof of the cab. The rest of the cab can be formed by a floor or one or more side walls, in particular also by a frame. The side walls can be connected to the roof structure, e.g., to the lower roof assembly, between the fresh air opening and the circulation opening, or it can be sealed.

The side walls can have metal, plastic or glass elements which are connected to the roof structure via customary means.

Overall, the course of the air flow in the roof structure can be described as follows. In the air-guiding element there is a pressure gradient, in particular positive or negative pressure, which is generated by the first or second fan. The fresh air which can be sucked up or suctioned via the filter arrangement through the fresh air opening or fresh air inlet in a filtered manner into the air-guiding element, and the recirculated air, which can be sucked up or suctioned via the second filter element, through the circulation opening in a filtered manner from the cab into the air-guiding element, can be mixed in the air-guiding element and can be guided by means of the pressure gradient in the air-guiding element, i.e., in the sealed region, into the air-conditioning chamber. The mixed air can subsequently pass through the air-conditioning-system assembly where it is either heated or cooled. The air-conditioned air is then discharged at an increased speed into the air-conditioning chamber or outlet chamber, from where the air-conditioned air is conducted into the cab via the ventilation opening.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
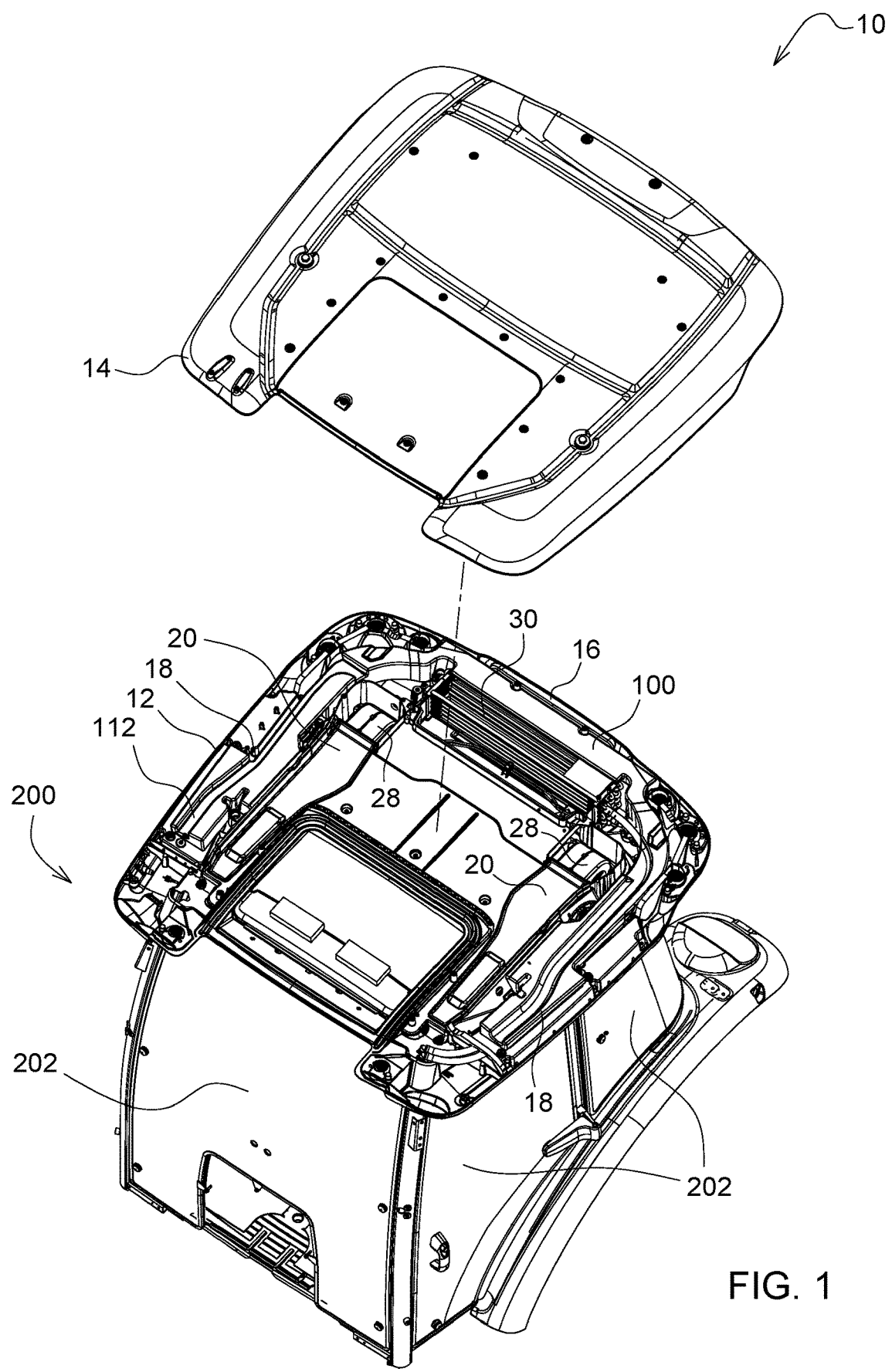
FIG. 1 shows a perspective view of a first embodiment of a roof structure.

FIG. 1 shows a schematic illustration of a first embodiment of the roof structure 10 for an agricultural vehicle on a cab 200. The roof structure 10 comprises a lower roof assembly 12 and an upper roof assembly 14 and an air-guiding element 100. The upper roof assembly 14 is connectable to the lower roof assembly 12, in particular the upper roof assembly 14 can be releasably or fixedly connectable to the lower roof assembly 12 or can be releasably or fixedly fastenable to the lower roof assembly 12. The lower roof assembly 12 or the upper roof assembly 14 comprises a ventilation opening 32 for guiding or removing air-conditioned air from the roof structure 10, in particular from an air-guiding element 100, or for supplying air-conditioned air into the cab 200.

The lower roof assembly 12 or the upper roof assembly 14 comprises a circulation opening 24 for supplying recirculated air from a cab 200 into the roof structure 10, in particular into the air-guiding element 100. The air-guiding element 100 is arranged between the lower and upper roof assembly 12, 14 and at the circulation opening 24 and at the ventilation opening 32 in such a manner that the air-guiding element 100 is designed as a region sealed in relation to an external environment. The air-guiding element 100 can therefore be surrounded by means of the lower and upper roof assembly 12, 14. The air-guiding element 100 comprises at least one air-conditioning chamber 16 and an inlet chamber 18 and an outlet chamber 20. The air-conditioning chamber 16 can be arranged between the inlet chamber 18 and the outlet chamber 20, and the inlet chamber 18 and the outlet chamber 20 can be designed as chambers which are separated from each other.

FIG. 1 shows an air-guiding element 100 which is formed in two pieces and comprises an air-conditioning chamber 16, two inlet chambers 18 for supplying recirculated air and two outlet chambers 20 for guiding air-conditioned air into the cab. Each inlet chamber 18 comprises a circulation opening 24 for supplying recirculated air. The air-conditioning chamber 16 is arranged between the inlet chamber 18 and the outlet chamber 20, and therefore the inlet chamber 18 and the outlet chamber 20 are designed as chambers which are separated from each other. The inlet chamber 18 and the air-conditioning chamber 16 are connected in terms of flow, and therefore recirculated air can flow from the inlet chamber 18 into the air-conditioning chamber 16, and the outlet chamber 20 and the air-conditioning chamber 16 are connected in terms of flow, and therefore recirculated air or fresh air or a mixture of recirculated air and fresh air can flow from the inlet chamber 18 into the air-conditioning chamber 16.

In addition, the air-conditioning chamber 16 can comprise a fresh air opening 22 for supplying fresh air. The air-guiding element 100 is then arranged between or in the lower and upper roof assembly 12, 14 and at the fresh air opening 22 and at the circulation opening 24 and at the ventilation opening 32 in such a manner that the air-guiding element 100 is designed as a region sealed in relation to an external environment.

In addition, the air-guiding element 100 has a cable duct 112 in which connecting lines, i.e., cables or hoses, are arranged. In addition, two second fans 28 are arranged in the air-conditioning chamber 16, wherein each second fan 28 has a second fan inlet and a second fan outlet. An air-conditioning-system assembly 30 is arranged at the air-conditioning chamber 16, in particular in a recess within the air-conditioning chamber 16. In the operating state, the second fan inlet can suck up air from the air-conditioning chamber 16 and the second fan outlet can discharge air into the outlet chamber 20. The air-guiding element 100 furthermore has an air-conditioning outlet 120 in the air-conditioning chamber 16 and an air-conditioning inlet 122 in the air-conditioning chamber 16 or the outlet chamber 20. The air-conditioning-system assembly 30 can be arranged at the air-conditioning inlet 120 and air-conditioning outlet 122, in particular can be connected in terms of flow thereto, in such a manner that the mixture of fresh air and recirculated air from the air-conditioning outlet 120 of the air-conditioning chamber 16 can be guided or can flow into the air-conditioning-system assembly 30 and out of the air-conditioning-system assembly 30 into the air-conditioning inlet 122 of the air-conditioning chamber 16 or of the outlet chamber 20. The air outlet 106 is arranged at the outlet chamber 20 of the air-guiding element 100, and therefore the air-conditioned air mixture of filtered fresh air and recirculated air from the cab 200 can be guided again into the cab 200.

FIG. 1 in particular shows a schematic illustration of a first embodiment of the cab 200 for an agricultural vehicle comprising a roof structure 10. The cab 200 describes the above-described roof structure 10 and side walls 202, here four pieces, made from glass. The side walls 202 are fastened to the lower roof assembly 12 or are releasably connected thereto.

Figure 2:
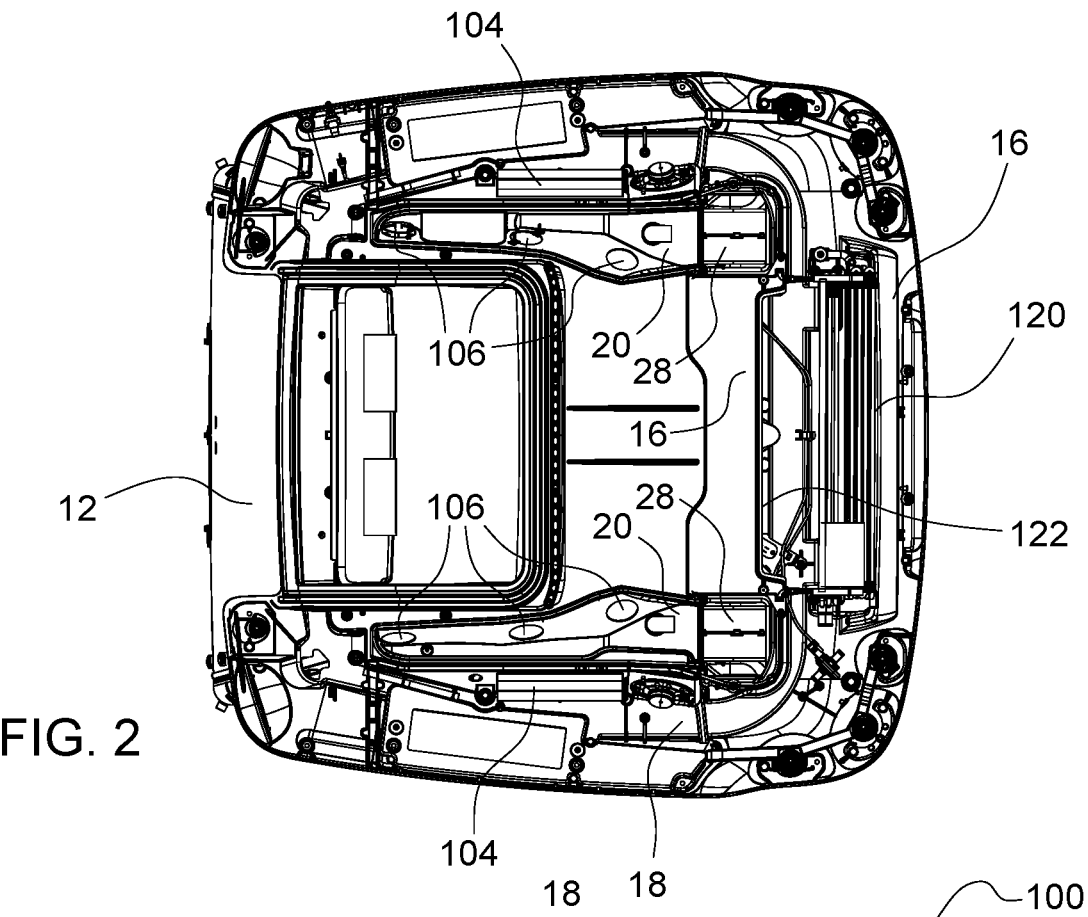
FIG. 2 shows a schematic view of a second embodiment of a roof structure.

FIG. 2 shows a schematic illustration of a second embodiment of the roof structure 10, in particular of the lower roof assembly 12 with an air-guiding element, which is illustrated transparently. The roof structure 10 shown in FIG. 2 substantially corresponds to the roof structure 10 shown in FIG. 1, and therefore only the differences will be discussed below.

In general, the air-guiding element 100 at the air-conditioning chamber 16 has a fresh air inlet 102 for supplying fresh air into the air-guiding element. However, the air-guiding element 100 can also additionally have a fresh air inlet 102, or have just one fresh air inlet 102, at the inlet chamber 18. Furthermore, the air-guiding element 100 at the inlet chamber 18 has a circulation inlet 104 for supplying recirculated air into the air-guiding element and at the outlet chamber 20 has an air outlet 106 for discharging mixed air out of the air-guiding element 100. The fresh air opening 22 is fixedly or releasably connected to the fresh air inlet 102 and the circulation opening 24 is fixedly or releasably connected to the circulation inlet 104 and the air outlet 106 is fixedly or releasably connected to the ventilation opening 32. In this way, the air-conditioned mixture can be mixed in the air-guiding element 100 and guided from the fresh air opening 22 via the fresh air inlet 102 and from the circulation opening 24 via the circulation inlet 104 to the air outlet 106 and via the ventilation opening 32 into the cab. The connecting points can be sealed. The air-guiding element 100 shown in FIG. 2 comprises two inlet chambers 18 each having a circulation inlet 104, an air-conditioning chamber 16 with a fresh air inlet 102, an air-conditioning outlet 120 and an air-conditioning inlet 122 and two outlet chambers 20 each having three air outlets 106. The air-conditioning-system assembly 30 is arranged at, in particular in, a recess in the air-conditioning chamber 16. FIG. 2 shows a transparent air-guiding element 100, and therefore the flow direction of the air within the air-guiding element 100 can be described as follows. The fresh air and the recirculated air can be sucked up or suctioned by the two second fans 28, can be mixed in the air-guiding element 100 and can be guided in the sealed region to the air-conditioning chamber 16. In addition, the air which is air-conditioned by means of the air-conditioning-system assembly 30 can be guided from the air-conditioning chamber 16 by means of the second fan 28 into the outlet chamber 20 and via the air outlets 106 and the ventilation openings 38 into the cab.

Figure 3:
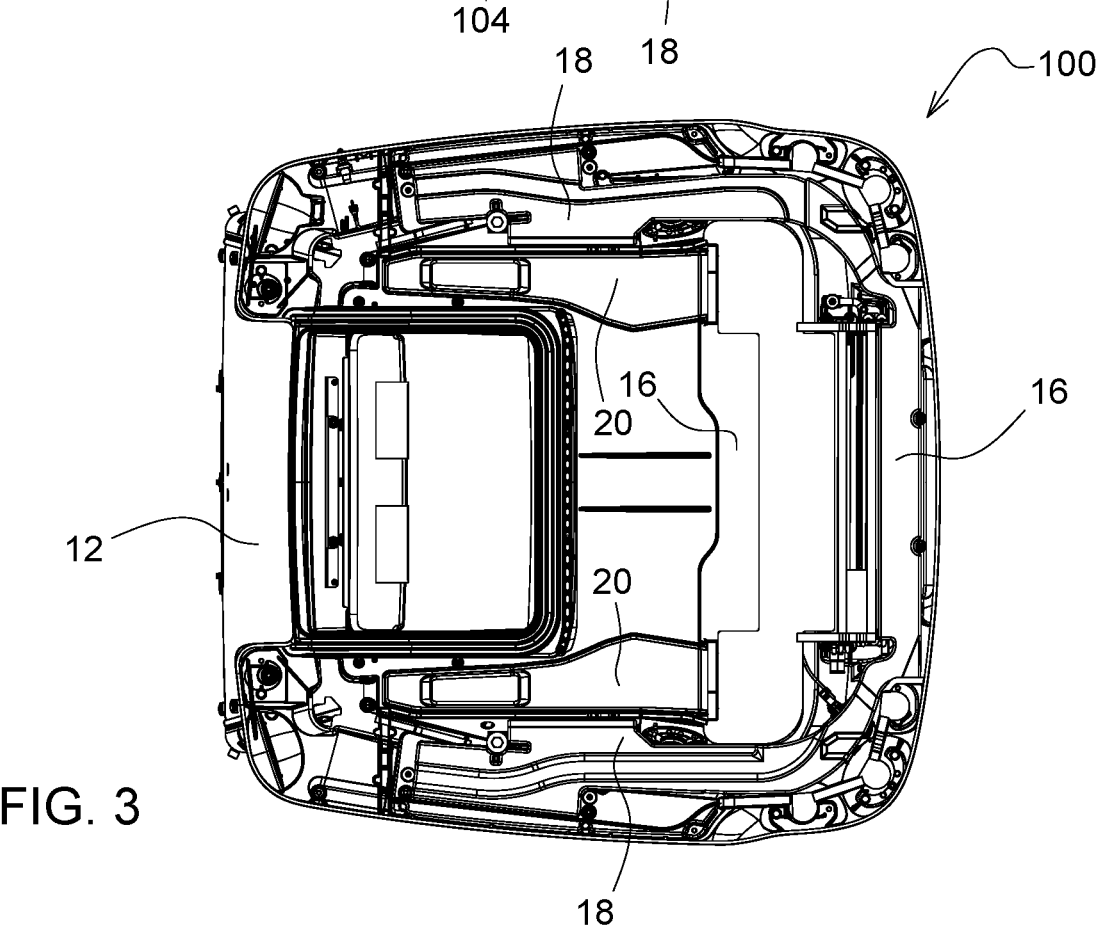
FIG. 3 shows a schematic top view of the roof structure of FIG. 2.

FIG. 3 shows a schematic illustration of the roof structure according to FIG. 2. The air-guiding element 100 shown in FIG. 3 corresponds to the air-guiding element 100 which is illustrated transparently in FIG. 2, and therefore only the differences will be discussed below. The air-guiding element 10 comprises two inlet chambers 18, an air-conditioning chamber 16 and two outlet chambers 20, and is arranged in the lower roof assembly 12. The air-guiding element 100 is formed from a foam made from plastic.

Figure 4:
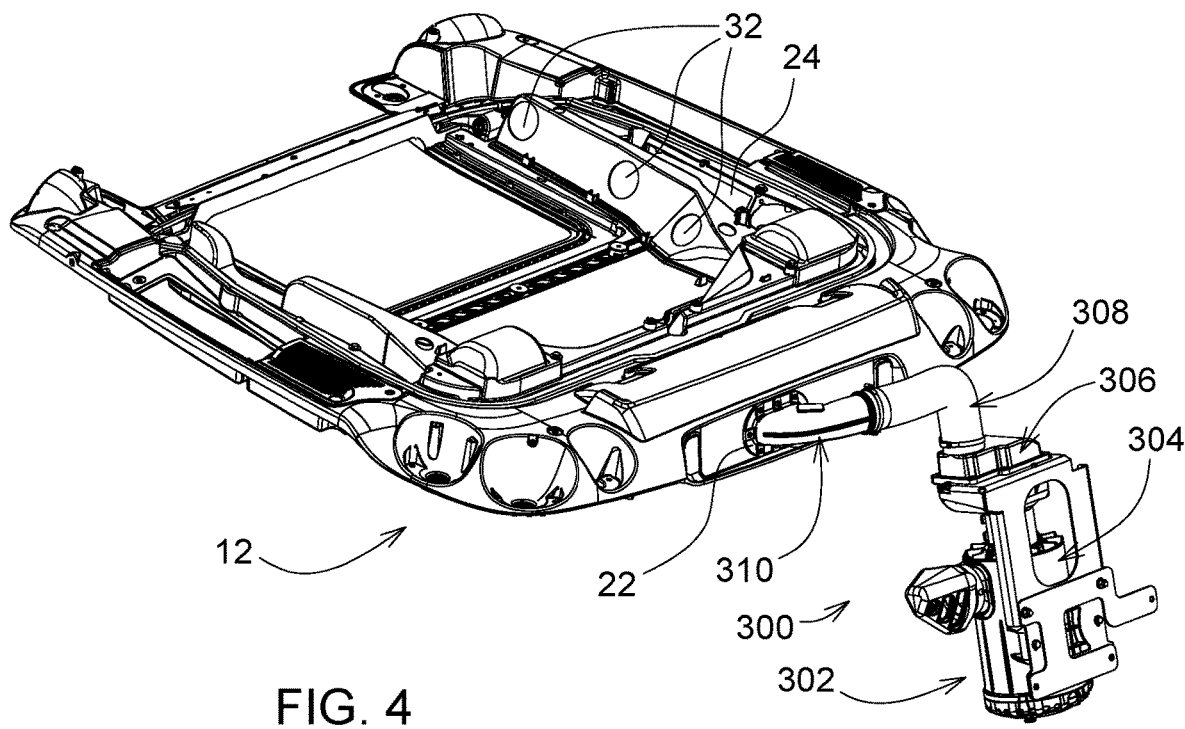
FIG. 4 shows a perspective view of a third embodiment of a roof structure.

FIG. 4 shows a perspective illustration of a third embodiment of a roof structure 10, in particular the lower roof assembly 12 with a filter arrangement 300. The roof structure 10 shown in FIG. 4 substantially corresponds to the roof structure 10 shown in FIGS. 1 to 3, and therefore only the differences will be discussed below. The filter arrangement 300 comprises a line 308, a first filter element 302, in particular with a filter, a holder 304 with a fastening element, a first fan 306 and a coupling element 310. The line 308 is connected to the coupling element 310, in particular is fastened to the coupling element 310, and therefore the line and coupling element are connected in terms of flow. The coupling element 310 is releasably connected to the fresh air inlet 22 of the lower roof assembly 12 or fastened to the fresh air inlet, but can also be fixedly connected or fastened thereto. The filter arrangement shown in FIG. 4 is connectable in particular to each of the roof structures 10 shown in FIGS. 1 to 3, in particular to the lower roof assembly 12 or to the air-guiding element 100.

Figure 5:
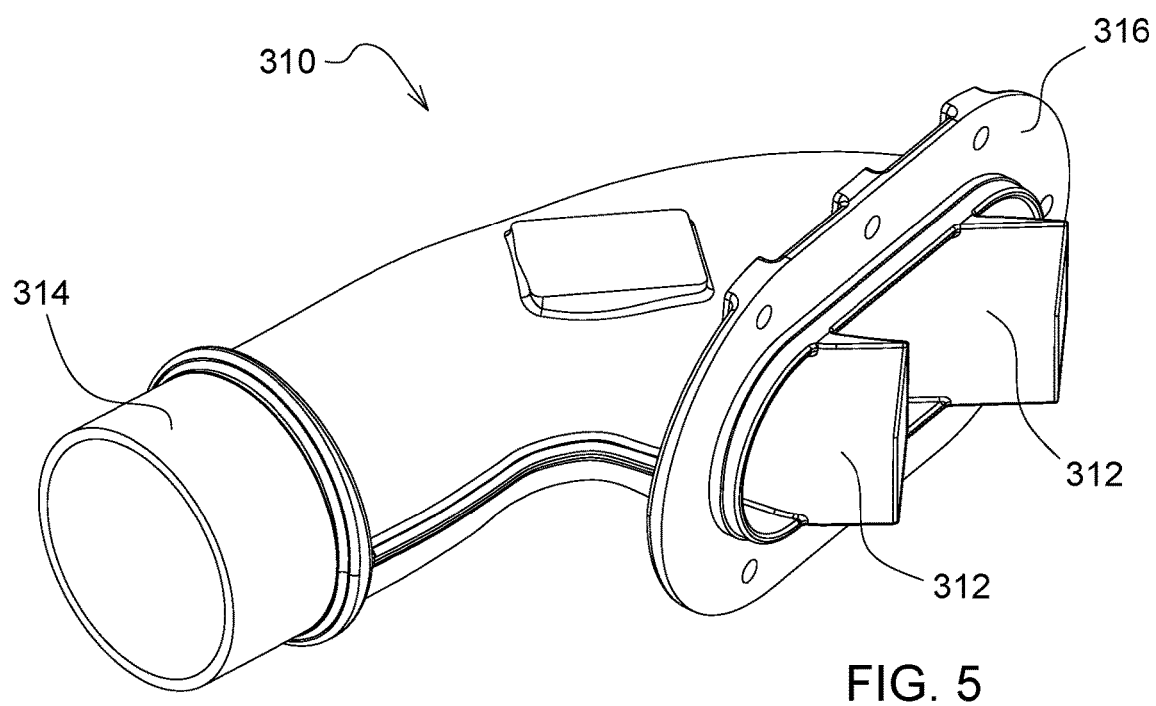
FIG. 5 shows a perspective view of the coupling element.

FIG. 5 shows a perspective illustration of the coupling element 310. The coupling element 310 shown in FIG. 5 substantially corresponds to the coupling element 310 shown in FIG. 4, and therefore only the differences will be discussed below. The coupling element 310 is fastenable to the lower roof assembly by means of a fastening installation, here a coupling flange 316. The line 308 is connectable to the coupling element 310 via a connecting branch 314. Also illustrated in FIG. 5 is an air guiding element 312. The air guiding element 312 may be coupled to the coupling flange 316, as illustrated in FIG. 5. The coupling element 310 may include one or more air guiding elements 312.

Figure 6:
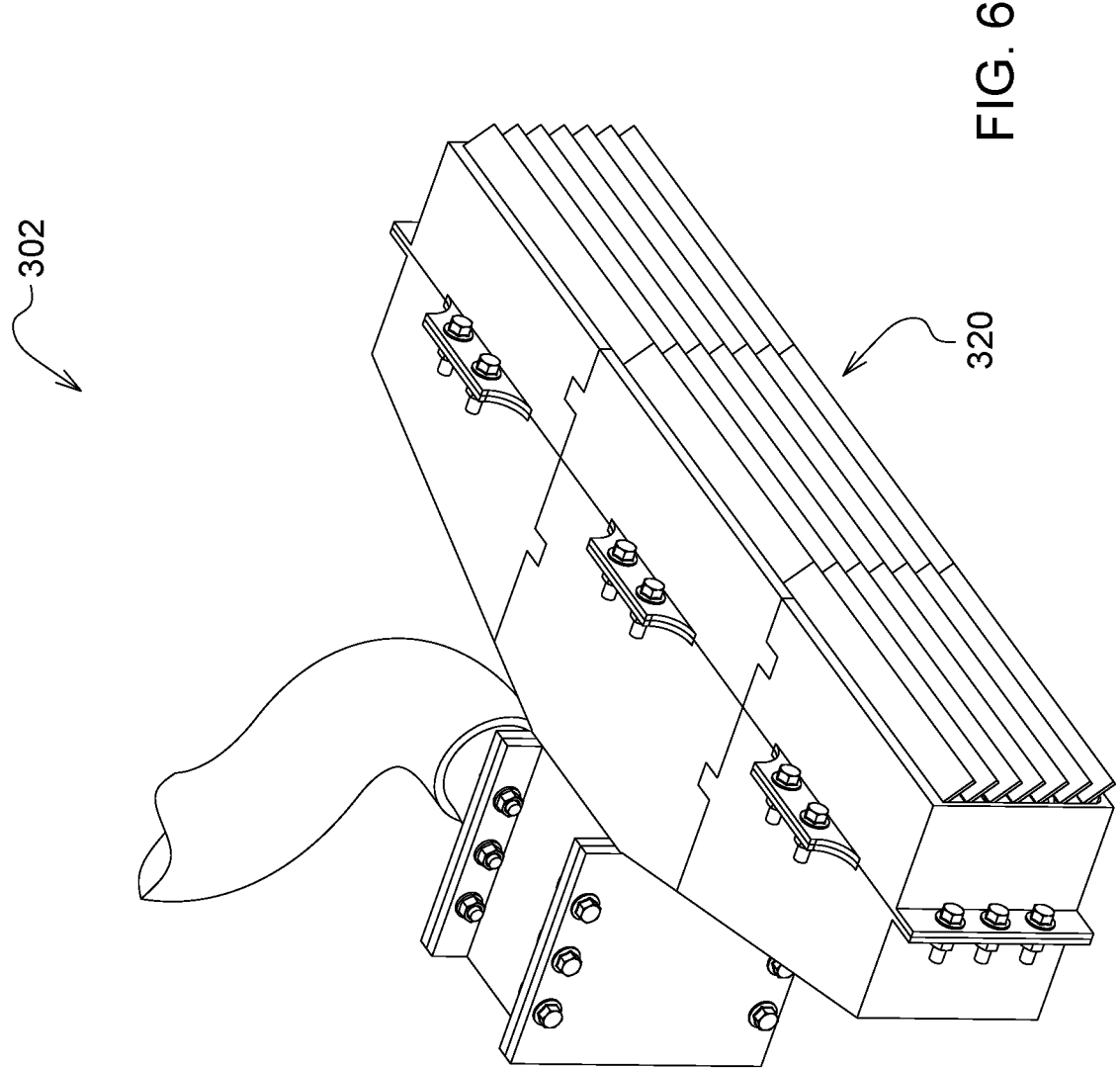
FIG. 6 shows a perspective view of a first filter element.

FIG. 6 shows a perspective illustration of a first filter element 302. The first filter element 302 has a front area 320 which is enlarged in comparison to the known first filter elements 302. As a result, the volumetric flow into the cab 200 and thus the pressure in the roof structure 10 or the cab 200 are increased.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A roof structure for an agricultural vehicle, comprising:
an upper roof assembly;
a lower roof assembly releasably coupled to the upper roof assembly, where the lower roof assembly or the upper roof assembly comprises a ventilation opening for guiding air-conditioned air and a circulation opening for supplying recirculated air;
an air-guiding element arranged between the lower and upper roof assembly, the air-guiding element further disposed at the circulation opening and the ventilation opening, the air-guiding element comprises an air-conditioning chamber,
a filter arrangement including a first filter element and a first fan, the filter arrangement being arranged at a fresh air opening, wherein the fresh air opening is defined in the lower roof assembly and the filter arrangement is exterior to the upper and lower roof assemblies;
wherein a region sealed in relation to an external environment is formed;
further wherein the filter arrangement and the lower roof assembly are coupled via a coupling element.

2. The roof structure of claim 1, wherein the air-guiding element further comprises:
an inlet chamber; and
an outlet chamber;
wherein, the air-conditioning chamber is arranged between the inlet chamber and the outlet chamber.

3. The roof structure of claim 2, wherein the inlet chamber and the outlet chamber are separated from one another.

4. The roof structure of claim 1, wherein the lower roof assembly comprises a sidewall with the fresh air opening for supplying fresh air.

5. The roof structure of claim 4, wherein the air-guiding element is arranged between the lower and upper roof assembly, the air-guiding element further disposed at the fresh air opening, the circulation opening, and at the ventilation opening such that the air-guiding element comprises the region sealed in relation to the external environment.

6. The roof structure of claim 2, wherein:
the air-guiding element at the inlet chamber or the air-conditioning chamber comprises a fresh air inlet for supplying fresh air into the air-guiding element and a circulation inlet for supplying recirculated air into the air-guiding element; and
the outlet chamber comprises an air outlet for discharging air-conditioned mixed air from the air-guiding element.

7. The roof structure of claim 6, wherein the fresh air opening is connected to the fresh air inlet, the circulation opening is connected to the circulation inlet, and the air outlet is connected to the ventilation opening such that the fresh air and the recirculated air can be mixed in the air-guiding element and be guided in the air-guiding element from the fresh air opening and the circulation opening to the air outlet.

8. The roof structure of claim 1, further comprising a second filter element removably arranged at the circulation opening or at a circulation inlet.

9. The roof structure of claim 1, wherein the air-guiding element is made from a plastic.

10. The roof structure of claim 1, wherein the air-guiding element comprises a cable duct.

11. The roof structure of claim 1, further comprising the first fan and a second fan, the second fan being arranged in an air-conditioning chamber or in an outlet chamber.

12. The roof structure of claim 11, further comprising an air-conditioning-system assembly arranged at the air-conditioning chamber or at the outlet chamber.

13. The roof structure of claim 11, wherein the second fan comprises a second fan inlet and a second fan outlet, wherein the second fan inlet suctions air from the air-conditioning chamber or the second fan outlet discharges air into the outlet chamber.

14. A cab for an agricultural vehicle, comprising:
a frame; and
a roof structure supported by the frame, the roof structure comprising:
an upper roof assembly;
a lower roof assembly releasably coupled to the upper roof assembly, where the lower roof assembly or the upper roof assembly comprises a ventilation opening for guiding air-conditioned air and a circulation opening for supplying recirculated air;
an air-guiding element arranged between the lower and upper roof assembly, the air-guiding element further disposed at the circulation opening and the ventilation opening;
a first fan and a second fan, the second fan being arranged in an air-conditioning chamber or in an outlet chamber;
a cable duct defined between the lower roof and the upper roof, wherein the cable duct comprises a channel with an interior portion and an exterior portion;
wherein removing the upper roof from the lower roof exposes the interior portion of the cable duct;
wherein a region sealed in relation to an external environment is formed;
further wherein the second fan comprises a second fan inlet and a second fan outlet, wherein the second fan inlet suctions air from the air-conditioning chamber or the second fan outlet discharges air into the outlet chamber.

15. The cab of claim 14, further comprising at least one side wall, the roof structure comprising a filter arrangement.

16. A roof structure for an agricultural vehicle, comprising:
an upper roof assembly;
a lower roof assembly releasably coupled to the upper roof assembly, where the lower roof assembly or the upper roof assembly comprises a ventilation opening for guiding air-conditioned air and a circulation opening for supplying recirculated air;
an air-guiding element arranged between the lower and upper roof assembly, the air-guiding element further disposed at the circulation opening and the ventilation opening;
a first fan located exterior of the upper and lower roof assemblies; and
a second fan located within or between the upper and lower roof assemblies;
wherein a region sealed in relation to an external environment is formed;
further wherein the air-guiding element comprises an air-conditioning chamber, an inlet chamber, an outlet chamber, the air-conditioning chamber is arranged between the inlet chamber and the outlet chamber.

17. The roof structure of claim 16, further comprising a filter arrangement including a first filter element or the first fan, the filter arrangement being arranged at a fresh air opening.

18. The roof structure of claim 17, further comprising a second filter element removably arranged at the circulation opening or at a circulation inlet.

19. The roof structure of claim 16, wherein the second fan is arranged in an air-conditioning chamber or in an outlet chamber.

20. The roof structure of claim 16, further wherein the second fan comprises a second fan inlet and a second fan outlet, wherein the second fan inlet suctions air from the air-conditioning chamber or the second fan outlet discharges air into the outlet chamber.

* * * * *